United States Patent

Erickson

[15] 3,702,961
[45] Nov. 14, 1972

[54] DEMAND REGULATED DC TO DC POWER SUPPLY

[72] Inventor: Gerald L. Erickson, Richland, Wash.

[73] Assignee: The United States of America as represented by the United States Atomic Energy Commission

[22] Filed: March 19, 1971

[21] Appl. No.: 126,223

[52] U.S. Cl. ................................ 321/2, 331/112
[51] Int. Cl. .......................................... H02m 3/32
[58] Field of Search ........... 321/2; 331/146, 149, 112

[56] References Cited

UNITED STATES PATENTS

| | | |
|---|---|---|
| 3,417,306 | 12/1968 | Knak ........................ 321/2 X |
| 3,300,705 | 1/1967 | Hunstad ..................... 321/2 |
| 3,278,861 | 10/1966 | Cunningham ............. 331/112 |
| 3,295,041 | 12/1966 | Bize .............................. 321/2 |
| 3,533,010 | 10/1970 | Bowles ..................... 321/2 X |
| 3,553,568 | 1/1971 | Saba .......................... 321/2 X |

*Primary Examiner*—William M. Shoop, Jr.
*Attorney*—Roland A. Anderson

[57] ABSTRACT

A blocking oscillator dc to dc converter is used to supply voltage to a variable load. The load current is amplified and the amplified load current is integrated to provide a driving current which is a function of the load current. The driving current is supplied to the blocking oscillator to increase the frequency of the blocking oscillator as the load current increases.

3 Claims, 2 Drawing Figures

Inventor
Gerald L. Erickson

Attorney

DEMAND REGULATED DC TO DC POWER SUPPLY

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In the development of miniature electronic devices, one of the basic problems has been the development of efficient miniature low-voltage dc to high-voltage dc converters. Using blocking oscillators or other types of oscillators together with transformers, reasonably efficient dc to dc converters have been developed. These dc to dc converters are particularly well suited to applications where the load requirements are relatively constant. However, where the load current requirements vary, the dc to dc converter must be set to operate at a frequency which will supply the maximum required current. In many applications, the maximum current requirements are required for a very small portion of the operating time so that the current drain on the device power supply is much higher than is necessary. Since batteries are the typical power source for these miniature devices, it is important that the current drain requirements be held to a minimum to increase the battery life.

An example of such a requirement is found in the personnel dosimeter employing a Geiger-Mueller counter tube. The Geiger-Mueller tube requires a high voltage for its operation and the current requirement is determined by the amount of ionizing radiation received. Since the dosimeter normally operates in a very low radiation environment, its normal requirements for current are low. However, when a large amount of radiation is received, the current requirements increase and the dc to dc converter must provide the maximum required current. Since the user of a dosimeter would undoubtedly leave the high radiation environment immediately, the percentage of time during which the highest current requirements are present is an extremely small percentage of the total operating time of the dosimeter. Thus a normal dc to dc converter is relatively inefficient in providing power to the Geiger-Mueller tube.

Circuits have been developed to minimize the power requirements during the times when radiation received by the Geiger-Mueller tubes is low. In one such circuit, each ionizing event in the Geiger-Mueller tube causes the blocking oscillator to oscillate one time. Thus, the frequency of the blocking oscillator can be set at a low value for economy of operation and this low frequency value will provide sufficient power to operate the Geiger-Mueller tube. The frequency of the blocking oscillator is the sum of the basic oscillator frequency plus the number of ionizing events received by the Geiger-Mueller tube. Since an increase in the frequency of the blocking oscillator increases the supply current available, the large number of ionizing events occurring when the Geiger-Mueller tube is in a high radiation environment will automatically provide an increase in supply current.

However, the circuit described above is useful only with a pulse type device, such as a Geiger-Mueller counter tube. If the load current varies as an analog function instead of a pulse function, such a device will lock on, oscillation of the blocking oscillator will stop, and the current available will drop to zero. Such a converter could not, for example, be used with a strobe or flash gun charging circuit. Furthermore, such a circuit could not compensate for increases in the leakage current of a Geiger-Mueller tube.

It is therefore an object of this invention to provide an improved dc to dc converter for supplying a variable load.

Another object of this invention is to provide a dc to dc converter for supplying a variable load in which the frequency of the converter is regulated by the power required.

Another object of this invention is to provide a dc to dc converter for supplying a variable load which will respond to relatively slow changes in power requirements.

SUMMARY OF THE INVENTION

In practising this invention, a blocking oscillator type of dc to dc inverter is provided. The alternating current developed by the blocking oscillator is increased by a transformer and may be further increased by a voltage doubler rectifier circuit if desired. The dc output voltage is coupled to a series connected load and amplifier circuit so that the current supplied to the load also flows through the amplifier circuit. The amplifier circuit acts to amplify the load current to provide a driving current for the blocking oscillator. An integrator is coupled to the output of the amplifier to integrate the driving current and supply the integrated driving current to the blocking oscillator circuit. The amplifier circuit and the integrating circuits are designed so that the increase in driving current to the blocking oscillator is (a function of) the increase in the load current. The increase in the driving current to the blocking oscillator circuit acts to increase the frequency of the blocking oscillator thus supplying more current to the load.

DETAILED DESCRIPTION OF THE INVENTION

Figure 1:
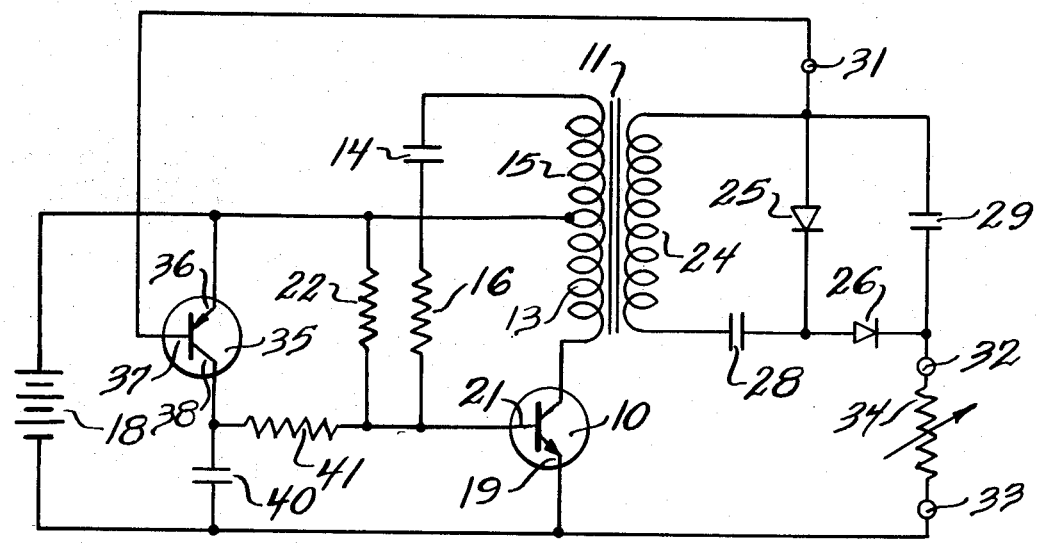
FIG. 1 is a schematic showing the circuit of the invention.

Referring to FIG. 1, there is shown a schematic of the invention. A blocking oscillator circuit includes transistor 10, primary windings 13 and 15 of transformer 11, capacitor 14, and resistor 16. The blocking oscillator is of a conventional design with the transformer winding 15, capacitor 14, and resistor 16 forming a feedback network. A driving current for transistor 10 is provided from battery 18 connected to emitter 19 and to base 21 through resistor 22. Secondary winding 24 provides an ac output voltage which is of greater magnitude than the dc voltage of battery 18. This ac voltage is rectified and further increased in a voltage multiplier of conventional design consisting of diodes 25 and 26 and capacitors 28 and 29. The output dc supply voltage is developed across capacitor 29 and is available at output terminals 31 and 32.

Output terminal 31 is connected to base 37 of transistor 35 and emitter 36 of transistor 35 is connected to battery 18. Battery 18 is also connected to terminal 33. A load 34 is connected between terminals 32 and 33. Thus, the supply current to load 34 flows through battery 18, emitter 36, base 37, to terminal 31. Load 34 has been shown as a variable resistor to indicate that the load varies with time and therefore the current requirements of the dc to dc converter will vary with time.

The supply current flowing through transistor 35 is amplified and appears on collector 38. This current is integrated by the integrator consisting of capacitor 40 and resistor 41 and the integrated current is applied to base 21 of transistor 10 to provide a driving current to transistor 10. As the load current requirements increase, the driving current supplied to base 21 of transistor 10 is also increased and the frequency of oscillation of the blocking oscillator will increase. The increase in the frequency of the blocking oscillator increases the current available to the load. By using the integrating circuit, abrupt changes in the load requirements, such as are occasioned by pulses developed by load 34, are averaged out and do not increase the frequency of the blocking oscillator to too large a value. The parameters of the integrating circuit are chosen so that the frequency of the oscillator will be varied over the required range to supply the particular load 34. The described demand regulated dc to dc converter circuit will efficiently supply load current at a rated load voltage independently of the type or nature of the load. It is therefore directly applicable as a supply for Geiger-Mueller tubes and ion chambers which have pulse type current loads, or as a part of a charging circuit for a strobe or flash gun, or as the power supply for a TV camera tube, which have more slowly varying load characteristics.

Figure 2:
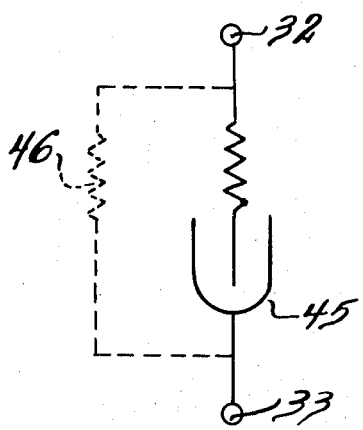
FIG. 2 is a second embodiment of the circuit shown in FIG. 1.

Referring to FIG. 2, there is shown a Geiger-Mueller tube 45 coupled to terminals 32 and 33 of circuit of FIG. 1. As stated above, the Geiger-Mueller tube 45 will develop current pulses as the tube is activated by ionizing radiation. The integrating circuit of FIG. 1 effectively averages out these pulses to provide the proper driving current to change the frequency of operation of the blocking oscillator. Geiger-Mueller tube 45 will also have a leakage current represented by the dashed resistor 46. This leakage current can vary over a wide range during the life of the tube and it is necessary to increase the frequency of oscillation of the blocking oscillator to compensate for an increase in the leakage current. If this cannot be done, the dc to dc converter circuit will have to be set to oscillate at a frequency which will provide the maximum expected leakage current and thus will not be able to achieve maximum efficiency of operation. The circuit described in FIG. 1 acts to sense the increase in the leakage current as well as the pulse currents caused by the ionizing events and thus will compensate automatically for the changes in the leakage current.

An example of the performance characteristics of the demand regulated dc to dc converter of this invention is shown in the table below.

TABLE 1

Performance Characteristics of Demand Regulated dc to dc Converter

| Source Voltage | Load Current | Output Voltage | Input Current |
| --- | --- | --- | --- |
| 9V | 0 μa | 655 | 0.3 ma. |
| 9V | 2 μa | 635 | 2.4 ma. |
| 9V | 4 μa | 635 | 4.8 ma. |
| 9V | 6 μa | 637 | 6.5 ma. |
| 9V | 8 μa | 638 | 8.0 ma. |
| 9V | 10 μa | 638 | 9.5 ma. |
| 9V | 12 μa | 638 | 11.0 ma. |
| 9V | 14 μa | 640 | 12.5 ma. |
| 9V | 16 μa | 640 | 13.5 ma. |
| 9V | 18 μa | 639 | 14.5 ma. |
| 9V | 20 μa | 638 | 15.0 ma. |

As can be seen from the above Table, a current of 15 milliamps would be required if the demand regulated dc to dc converter had to be operated at all times to supply the maximum load current. At the very low load currents of 0 to 2 microamps, a maximum supply current of 2.4 milliamps was required which results in a great saving in the power requirements of the device.

The embodiments of the invention in which an exclusive property or privilege is claimed are defined as follows:

1. A demand regulated dc to dc converter for supplying a dc load current to a variable load, including in combination, a dc power supply, oscillator means coupled to said power supply for developing a periodic output voltage and including transformer means for increasing the magnitude of said periodic output voltage, circuit means including first and second output terminals, said circuit means being coupled to said transformer means for developing the dc load current at said first and second output terminals from said periodic output voltage, driving current means coupled to said power supply, said second output terminal and said oscillator means, said variable load being coupled to said first output terminal and said driving current means whereby said dc load current flows through said variable load and said driving current means, said driving current means including integrating means and being responsive to said load current to develop an integrated driving current from said power supply for said oscillator means, said oscillator means being responsive to said integrated driving current to increase the period of said periodic voltage with a decrease in the magnitude of said integrated driving current and to decrease the period of said periodic voltage with an increase in the magnitude of said integrated driving current.

2. The demand regulated dc to dc converter of claim 1 wherein said driving current means includes amplifier means coupled to said second output terminal and said variable load whereby said dc load current flows through said variable load and said amplifier means, said amplifier means being responsive to said load current to develop a driving current, said integrating means coupling said amplifier means to said oscillator means for integrating said driving current and supplying said integrated driving current to said oscillator means.

3. The demand regulated dc to dc converter of claim 2 wherein, said oscillator means is a blocking oscillator circuit including a first transistor having a collector electrode coupled to said transformer means, a base electrode and an emitter electrode, said amplifier means is a second transistor having a first electrode coupled to said variable load, a second electrode coupled to said second output terminal and a third electrode, and said integrating means is resistance means coupling said third electrode to said base electrode and capacitance means coupling said third electrode to said first electrode.

* * * * *